United States Patent [19]

May et al.

[11] Patent Number: 5,439,762
[45] Date of Patent: Aug. 8, 1995

[54] HYDRATED AMORPHOUS SILICA BATTERY

[76] Inventors: Dan P. May, 808 Majorca, Coral Gables, Fla. 33134; Jacob J. Swanko, II, 1561 Florida Mango Rd., #405, West Palm Beach, Fla. 33406

[21] Appl. No.: 212,870
[22] Filed: Mar. 15, 1994
[51] Int. Cl.⁶ .............................................. H01M 4/02
[52] U.S. Cl. .................................... 429/218; 429/233
[58] Field of Search ............... 429/218, 245, 248, 129, 429/130, 135, 142, 241, 233, 232, 252, 218

[56] References Cited

U.S. PATENT DOCUMENTS

| | | | |
|---|---|---|---|
| 4,681,750 | 7/1987 | Johnson et al. | 423/339 |
| 5,006,430 | 4/1991 | Duclot | 429/191 |
| 5,075,183 | 12/1991 | Yamaguchi et al. | 429/139 |
| 5,091,275 | 2/1992 | Brecht et al. | 429/247 |
| 5,221,497 | 6/1993 | Watanabe et al. | 252/313.2 |

FOREIGN PATENT DOCUMENTS

14476TA 12/1970 Japan .

*Primary Examiner*—Prince Willis, Jr.
*Assistant Examiner*—M. Nuzzolillo

[57] ABSTRACT

Our improved battery material, hydrated amorphous silica, is primarily intended to be employed in situations where an electric battery cell's environment is demanding. Hydrated amorphous silica in the form of black opal ore (rock form) is reduced to a powder, of any particle size. This hydrated amorphous silica is attached to a conductive grid or weaving. This finished hydrated amorphous silica, can be used as an anode, electrode or plate; it is then set, with or in an alkaline or acid base metal, or other appropriate material, forming an electric battery cell.

2 Claims, No Drawings

HYDRATED AMORPHOUS SILICA BATTERY

BACKGROUND OF THE INVENTION

1. Field of the Invention

This invention is an improved electric battery cell, acid and alkaline, which will increase electric battery cell utility everywhere an electric battery cell is used.

An object of the invention is to provide improved charging ability of the electric battery cell utilizing hydrated amorphous silica as an anode, electrode or plate.

A further object of the invention is to provide a lightweight electric battery cell.

A further object of the invention is to provide an electric battery cell that can take large changes in, demand or charging.

A further object of the invention is to provide a versatile material for an electric battery cell.

A further object of the invention is to provide an increase in utility of an electric battery cell.

2. Summary of the Invention

Other objects will appear as the description proceeds.

Our improved battery material, hydrated amorphous silica, is primarily intended to be employed in situations where an electric battery cell's environment is demanding: vehicles of every size, shape and useful on earth or in space. Other materials are used to explain the invention, this does not imply the use of hydrated amorphous silica is limited to only those materials mentioned. All acid and alkaline material will work.

Hydrated amorphous silica in the form of black opal ore (rock form) is reduced to a powder, of any particle size, including, fine, course or rough. We do not limit our invention to hydrated amorphous silica in the black opal form. This hydrated amorphous silica is attached to a conductive grid or weaving; as a conductive paste; stamped; pressed; glued; sandwiched under large amounts of pressure; rolled on; squirted on; attached with, filaments or thread-like fibers; applied as an invert, bivert or foam; the conductive grid can be dipped. This finished Hydrated amorphous silica anode, electrode or plate, is then set, with or in a potassium sulfate anode, electrode or plate; potassium carbonate would work also. The combination forms a cell. A membrane can be used to separate the two, depending on the material used for the hydrated amorphous silica's, grid or weaving, and the other, active material's grid, weaving, plate or container.

These examples are cited to further explain the unique nature of hydrated amorphous silica used in electric battery cells. These examples are not intended to, limit use or material combinations in any way.

DESCRIPTION OF THE PREFERRED EMBODIMENTS

EXAMPLE ONE

Potassium sulfate was pressed on a black opal rock, producing a current.

EXAMPLE TWO

A working model was made. This model had two copper grids. One grid was sandwiched in potassium sulfate and served as the battery's electrode. The second grid, encased in course black opal powder, served as anode. The two grids were placed in a narrow plastic case, separated by a membrane of paper. The model's contact points were at opposite ends. Water was added. The model produced a current of 0.7 volts at low amps. This model was charged at various voltages and amps, at intended polarity and opposite. The model continues to produce a current.

EXAMPLE THREE

A second model, of alkaline verity, was made. In this model, the course black opal powder was rolled into a galvanized steel grid, serving as anode. The electrode was made of garden verity lime. A topless, aluminium soda can served as the electrode's contact point. Water was added. The model did not produce a current we could measure. Six of these round models were built and in a primitive fashion, wired in series. A one amp, 12 volt charge, placed on this configuration for two hours produced a 2 volt ½ amp charge. The one amp, 12 volt charge was continued for 24 hours. The voltage increased slightly, the amps increased to three. It is obvious that many equivalents may be substituted in the makeup of our electric battery cell. The hydrated amorphous silica we used is a source found in an ore form. Hydrated amorphous silica can be manufactured, under pressure, from waste glass, water and trace elements. Alloys added, with trace elements to increase the utility of the electric battery cell for a given use.

The electric battery cell could be used to provide a constant current as opposed to an environment of large changes in, demand or charging. Hydrated amorphous silica could be processed to include spent uranium fuel, at low levels. This hydrated amorphous silica grid cell when paired with, a potassium or other appropriate material, will produce a predictable constant charge over a long period of time.

Having thus described our invention, we do not limit our invention to the specific embodiment we have described but, intend that claims shall include equivalent forms. We have shown that the structures have been provided with which the objects of the invention are achieved.

Having thus described our invention, what we claim as new and desire to secure by Letters Patent of the United States is:

1. An electrochemical cell comprising a first and a second electrode, an electrolyte and a separator, wherein one of the electrodes comprises hydrated amorphous silica.

2. An electrode comprising a conductive substrate and a material comprising hydrated amorphous silica.

* * * * *

UNITED STATES PATENT AND TRADEMARK OFFICE
CERTIFICATE OF CORRECTION

PATENT NO. : 5,439,762
DATED     : August 8, 1995
INVENTOR(S): Dan P. May and Jacob John Swanko, II It is certified that error appears in the above-indentified patent and that said Letters Patent is hereby corrected as shown below:

Title page, insert item [73] to read:

-- Jacob John Swanko, II
   West Palm Beach, FL --

Signed and Sealed this

Sixteenth Day of April, 1996

Attest:

BRUCE LEHMAN

*Attesting Officer*          *Commissioner of Patents and Trademarks*